(12) United States Patent
Yu et al.

(10) Patent No.: US 12,236,974 B2
(45) Date of Patent: Feb. 25, 2025

(54) METHOD AND APPARATUS FOR PROCESSING SIGNAL, COMPUTER READABLE MEDIUM

(71) Applicant: Beijing Baidu Netcom Science Technology Co., Ltd., Beijing (CN)

(72) Inventors: Libiao Yu, Beijing (CN); Guochang Zhang, Beijing (CN); Jianqiang Wei, Beijing (CN)

(73) Assignee: Beijing Baidu Netcom Science Technology Co., Ltd., Beijing (CN)

( * ) Notice: Subject to any disclaimer, the term of this patent is extended or adjusted under 35 U.S.C. 154(b) by 275 days.

(21) Appl. No.: 17/872,909

(22) Filed: Jul. 25, 2022

(65) Prior Publication Data
US 2022/0358951 A1 Nov. 10, 2022

(30) Foreign Application Priority Data
Nov. 30, 2021 (CN) .......................... 202111440574.7

(51) Int. Cl.
*G10L 25/51* (2013.01)
*G10L 15/16* (2006.01)
(Continued)

(52) U.S. Cl.
CPC .............. *G10L 25/51* (2013.01); *G10L 15/16* (2013.01); *G10L 21/0224* (2013.01);
(Continued)

(58) Field of Classification Search
CPC ..... G10L 25/51; G10L 15/16; G10L 21/0224; G10L 25/18; G10L 2015/0631;
(Continued)

(56) References Cited

U.S. PATENT DOCUMENTS 8,718,275 B2 * 5/2014 Volcker ................... H04B 3/23
379/406.01
9,947,338 B1 * 4/2018 Koteshwara ............ H04R 5/02
(Continued)

FOREIGN PATENT DOCUMENTS

CN 102044253 A 5/2011
CN 102118678 A 7/2011
(Continued)

OTHER PUBLICATIONS

Birkett, A. N., and R. A. Goubran. "Nonlinear echo cancellation using a partial adaptive time delay neural network." Proceedings of 1995 IEEE Workshop on Neural Networks for Signal Processing. IEEE, 1995.
(Continued)

*Primary Examiner* — Douglas Godbold
(74) *Attorney, Agent, or Firm* — Ice Miller LLP; Justin D. Swindells

(57) ABSTRACT

A method and apparatus for processing a signal. An implementation of the method includes: acquiring a reference signal of a to-be-tested voice, the reference signal being a signal output to a voice output device, where the voice output device outputs the to-be-tested voice after obtaining the reference signal; receiving, from a voice input device, an echo signal of the to-be-tested voice, the echo signal being a signal of the to-be-tested voice collected by the voice input device; performing signal preprocessing on the reference signal and the echo signal respectively; and inputting the processed reference signal and the processed echo signal into a pre-trained time delay estimation model, to obtain a time difference between the reference signal and the echo signal output by the time delay estimation model.

18 Claims, 4 Drawing Sheets

(51) Int. Cl.
  *G10L 21/0224* (2013.01)
  *G10L 25/18* (2013.01)
  *G10L 15/06* (2013.01)
  *G10L 21/0208* (2013.01)
(52) U.S. Cl.
  CPC ...... *G10L 25/18* (2013.01); *G10L 2015/0631* (2013.01); *G10L 2021/02082* (2013.01)
(58) Field of Classification Search
  CPC ....... G10L 2021/02082; G10L 21/0264; G10L 21/0232; H04B 3/23; H04M 9/082; G10K 11/17879
  See application file for complete search history.

(56) References Cited

U.S. PATENT DOCUMENTS

| | | | |
|---|---|---|---|
| 10,720,949 B1* | 7/2020 | Rao | G06N 3/08 |
| 11,063,881 B1* | 7/2021 | Vijayasuganthan | H04L 47/748 |
| 2008/0317256 A1 | 12/2008 | Bachmann | |
| 2014/0233723 A1* | 8/2014 | Lou | H04M 9/082 379/406.01 |
| 2016/0035337 A1* | 2/2016 | Aggarwal | G06F 3/165 381/103 |
| 2018/0018984 A1* | 1/2018 | Dickins | G10L 21/0232 |
| 2018/0352095 A1 | 12/2018 | Liang | |
| 2018/0366101 A1* | 12/2018 | Deshpande | H04M 9/082 |
| 2021/0012767 A1* | 1/2021 | Kupryjanow | G10L 21/0208 |
| 2021/0082449 A1* | 3/2021 | Appleton | G10L 19/008 |
| 2021/0306466 A1 | 9/2021 | Loiko | |
| 2021/0319802 A1 | 10/2021 | Bai | |
| 2022/0277721 A1* | 9/2022 | Zhang | G10L 21/0208 |

FOREIGN PATENT DOCUMENTS

| | | |
|---|---|---|
| CN | 104994249 A | 10/2015 |
| CN | 106571147 A | 4/2017 |
| CN | 107333018 A | 11/2017 |
| CN | 109688284 A | 4/2019 |
| CN | 109831733 A | 5/2019 |
| CN | 110891236 A | 3/2020 |
| CN | 111223492 A | 6/2020 |
| CN | 111524498 A | 8/2020 |
| CN | 112289333 A | 1/2021 |
| CN | 112634923 A | 4/2021 |
| CN | 113160790 A | 7/2021 |
| CN | 113170024 A | 7/2021 |
| CN | 113192527 A | 7/2021 |
| CN | 113689871 A | 11/2021 |
| DE | 102019105458 A1 | 9/2020 |

OTHER PUBLICATIONS

Luo Zhen et al.; "Compare of Time Delay Estimation Methods of Acoustic Wave Signal in Strong Noise Environment"; Journal of Shenyang Institute of Aeronautical Engineering; http://www.cqvip.com; vol. 22, No. 2, pp. 45-48; Apr. 2005; English abstract only (5 pages).

Wang Xin-yi et al.; "Sub-sampling in flat delay estimation with application to an acoustic echo cancellation system"; English abstract only (4 pages).

Ziteng Wang et al.; "Weighted Recursive Least Square Filter and Neural Network Based Residual Echo Suppression for the AEC Challenge"; 2021 IEEE International Conference on Acoustics, Speech and Signal Processing (ICASSP), arXiv:2012.08551, pp. 141-145; 978-1-7605-5/20; copyright 2021 IEEE; DOI: 10.1109/ICASSP39728.2021.9414623 (5 pages).

Yi Zhang et al.; "Deep Multi-Task Network for Delay Estimation and Echo Cancellation"; arXiv:2011.02109; copyright 2011 (5 pages).

* cited by examiner

METHOD AND APPARATUS FOR PROCESSING SIGNAL, COMPUTER READABLE MEDIUM

CROSS-REFERENCE TO RELATED APPLICATIONS

This application claims priority to Chinese Patent Application No. 202111440574.7, filed with the China National Intellectual Property Administration (CNIPA) on Nov. 30, 2021, the content of which is incorporated herein by reference in its entirety.

TECHNICAL FIELD

The present disclosure relates to the field of computer technology, in particular to the technical fields of voice processing and deep learning, and more particularly, to a method and apparatus for processing a signal, and a computer readable medium.

BACKGROUND

Time delay estimation (TDE) is used to estimate a delay in time of two time-varying signals. In communication, TDE is mainly used in a linear echo cancellation front-end, to estimate a time difference between a signal collected by the microphone and a reference signal playback by the speaker, and to guide alignment of the reference signal and an echo signal collected by the microphone.

TDE is mainly based on correlation of signals, and has relatively high requirements on the magnitude or energy of signals, or on the linearity of signal phases. Actual communication products, especially personal PCs and handheld devices, have poor acoustic linearity, compared with the reference signal, the distortion of the echo is quite serious no matter on the magnitude or phase, and the correlation between the reference signal and the reference signal is not obvious enough, therefore often it is impossible to directly obtain an accurate time delay or it takes a long time to accumulate to obtain a relatively accurate delay estimation.

SUMMARY

A method and apparatus for processing a signal, and a computer readable medium, are provided.

According to a first aspect, some embodiments of the present disclosure provide a method for processing a signal, the method includes: acquiring a reference signal of a to-be-tested voice, the reference signal being a signal output to a voice output device, wherein the voice output device outputs the to-be-tested voice after obtaining the reference signal; receiving, from a voice input device, an echo signal of the to-be-tested voice, the echo signal being a signal of the to-be-tested voice collected by the voice input device; performing signal preprocessing on the reference signal and the echo signal respectively; and inputting the processed reference signal and the processed echo signal into a pre-trained time delay estimation model, to obtain a time difference between the reference signal and the echo signal output by the time delay estimation model, the time delay estimation model being used to represent a corresponding relationship between the reference signal, the echo signal and the time difference.

According to a second aspect, some embodiments of the present disclosure provide an apparatus for processing a signal, the apparatus includes: at least one processor; and a memory communicatively connected to the at least one processor; where the memory stores instructions executable by the at least one processor, and the instructions, when executed by the at least one processor, cause the at least one processor to perform the method according to any one of the implementations described in the first aspect.

According to a fourth aspect, some embodiments of the present disclosure provide a non-transitory computer readable storage medium storing computer instructions, wherein, the computer instructions, when executed by a computer, cause the computer to perform the method according to any one of the implementations described in the first aspect.

It should be understood that the content described in this section is not intended to identify key or important features of the embodiments of the present disclosure, nor is it intended to limit the scope of the present disclosure. Other features of the present disclosure will become readily understood from the following specification.

BRIEF DESCRIPTION OF THE DRAWINGS

The accompanying drawings are used for better understanding of the present solution, and do not constitute a limitation to the present disclosure. In which.

DETAILED DESCRIPTION OF EMBODIMENTS

Example embodiments of the present disclosure are described below with reference to the accompanying drawings, where various details of embodiments of the present disclosure are included to facilitate understanding, and should be considered merely as examples. Therefore, those of ordinary skills in the art should realize that various changes and modifications can be made to the embodiments described herein without departing from the scope and spirit of the present disclosure. Similarly, for clearness and conciseness, descriptions of well-known functions and structures are omitted in the following description.

Figure 1:
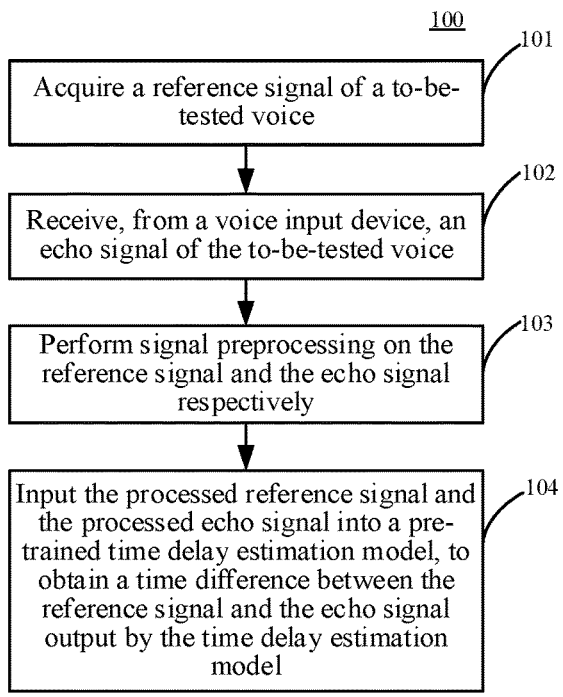
FIG. 1 is a flowchart of a method for processing a signal according to an embodiment of the present disclosure.

FIG. 1 shows a flow 100 of a method for processing a signal according to an embodiment of the present disclosure. The method for processing a signal includes the following steps:

Step 101, acquiring a reference signal of a to-be-tested voice.

The reference signal is a signal output to a voice output device, and the voice output device outputs the to-be-tested voice after obtaining the reference signal.

In the present embodiment, the reference signal is a signal output to the voice output device, a control device (such as a CPU) outputs the reference signal to the voice output device, and the voice output device plays the reference signal to obtain the to-be-tested voice. An executing body on which the method for processing runs may obtain the reference signal of the to-be-tested voice in various methods, such as, communicating with an audio generator to obtain the reference signal sent by the audio generator; or, directly generating the reference signal and sending the reference signal to the voice output device.

In the present embodiment, the voice output device is a device that outputs voice, for example, the voice output device is a speaker.

Step 102, receiving, from a voice input device, an echo signal of the to-be-tested voice.

The echo signal is a signal of the to-be-tested voice collected by the voice input device.

In the present embodiment, the voice input device is a device that collects the to-be-tested voice. For example, the voice input device may be a microphone.

In the present embodiment, an echo signal may be classified as a direct echo signal or an indirect echo signal based on a difference in transmission path.

Direct echo signal: after the voice output device plays an audio signal, the voice input device directly collects the audio signal to obtain an echo signal. The direct echo signal is not affected by the environment, but is heavily affected by the distance between the voice output device to the voice input device and the positions of the devices, so that the direct echo signal is a linear signal.

Indirect echo signal: after the voice output device plays an audio signal, the audio signal is picked up by the voice input device after being reflected by a complex and changeable wall. A magnitude of the indirect echo signal is affected by the factors such as a room environment, placement of objects, and a wall absorption coefficient, so that the indirect echo signal is a non-linear signal.

Accuracy of a traditional time delay estimation algorithm is highly dependent on the linearities of the reference signal and the echo signal. Therefore, the traditional time delay estimation algorithm has a better time delay estimation for the direct echo signal, but for the indirect echo signal, a time delay obtained between the reference signal and the echo signal is relatively inaccurate. The method for processing a signal provided in the present embodiment uses a time delay estimation model, which no longer depends on the linearities of the reference signal and the echo signal, and may estimate the time delay of both the direct echo signal and the indirect echo signal, which improves an accuracy of signal processing.

Step 103, performing signal preprocessing on the reference signal and the echo signal respectively.

In the present embodiment, performing signal preprocessing on the reference signal and the echo signal refers to processing the reference signal and the echo signal in a time domain or a frequency domain, so as to convert the reference signal and the echo signal into signals suitable for inputting into the time delay estimation model.

In the present embodiment, signal preprocessing may include filtering, chunking, windowing and other operations, which may reduce even eliminate the impact on quality of the reference signal due to factors such as aliasing, high-order harmonic distortion, high frequency caused by the voice generator itself and the equipment that collects the voice signal.

Figure 2:
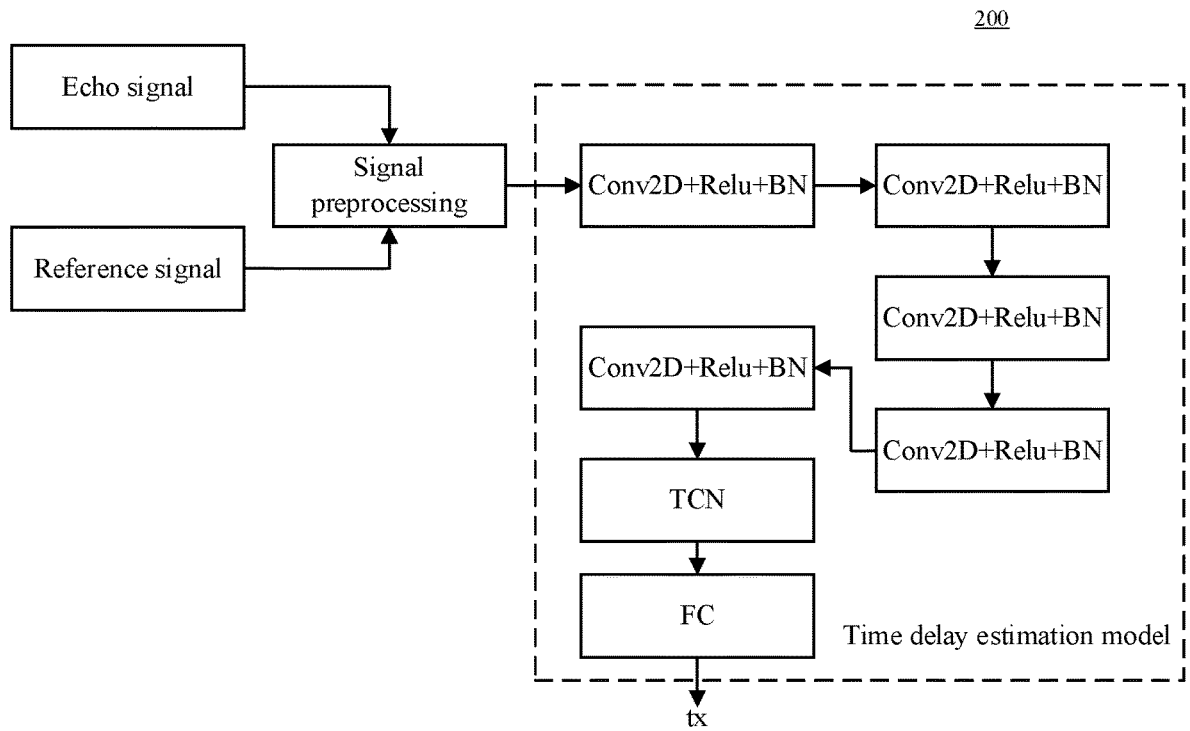
FIG. 2 is a schematic structural diagram of a time delay estimation model in embodiments of the present disclosure.

In some alternative implementations of the present embodiment, the performing signal preprocessing on the reference signal and the echo signal respectively, includes: performing subband decomposition and catenation on the reference signal and the echo signal; and obtaining magnitude spectrograms of the catenated signals to obtain the processed reference signal and the processed echo signal. As shown in FIG. 2, signal preprocessing is performed on both the reference signal and the echo signal, where the signal preprocessing includes: performing subband decomposition and catenation on each of the reference signal and the echo signal, then obtaining magnitude spectrograms of the catenated signals.

In this alternative implementation, the reference signal and the echo signal are wideband signals. By performing decomposition and catenation on the wideband signals, the reference signal and the echo signal may be effectively decomposed and reconstructed, which ensures validities of the reference signal and the echo signal.

In this alternative implementation, performing subband decomposition and catenation on the reference signal and the echo signal, provides an alternative method for digital signal processing, especially for wideband signal reception and processing, and facilitates the time delay estimation model to estimate a time difference between the reference signal and the echo signal.

In some alternative implementations of the present embodiment, the performing signal preprocessing on the reference signal and the echo signal respectively, includes: performing frequency domain transformation on the reference signal and the echo signal respectively, to obtain the processed reference signal and the processed echo signal.

In this alternative implementation, short time Fourier transform (STFT) may be used to perform frequency domain transformation on the reference signal and the echo signal. The short time Fourier transform is a general tool for voice signal processing, which defines a very useful time and frequency distribution class that specifies a magnitude of an arbitrary signal over time and frequency, where the magnitude is in the form of complex number. In fact, a process of computing short time Fourier transform is to divide a longer-time signal into shorter segments of a same length, and compute the Fourier transform on each of the shorter segments.

In this alternative implementation, performing frequency domain transformation on the reference signal and the echo signal, provides another alternative method for digital signal processing, and facilitates the time delay estimation model to estimate a time difference between the reference signal and the echo signal.

Step 104, inputting the processed reference signal and the processed echo signal into a pre-trained time delay estimation model, to obtain a time difference between the reference signal and the echo signal output by the time delay estimation model.

In the present embodiment, the time delay estimation model is used to represent a corresponding relationship between the reference signal, the echo signal and the time difference. The time delay estimation model is obtained by training based on long-term correlation between features of the reference signal and features of the echo signal. The time delay estimation model may use more parameters to learn at more granularity to learn features used for estimating the time delay and a relationship between the features, so as to quickly and accurately obtain the time difference between the reference signal and the echo signal based on the correlation.

In the present embodiment, the time delay estimation model may include: a convolutional neural network, a temporal convolutional network, and a fully connected layer, which are connected in sequence; the convolutional neural network is used to extract features of the reference signal and features of the echo signal, the features of the reference signal may represent characteristics of the reference signal, such as magnitude, energy, phase; a correlation collection module is used to determine long-term correlation between the features of the reference signal and the features of the echo signal; and a time delay extraction module is used to obtain the time difference between the reference signal and the echo signal based on the correlation. As shown in FIG. 2, the time delay estimation model includes: convolutional neural networks (CNN), a temporal convolutional network (TCN), and fully connected layers (FC). The convolutional neural networks adopt 5 layers of sub-networks, each layer of the sub-networks is activated by a convolution layer through a Relu activation function layer and then obtained by batch normalization (Conv2D+Relu+BN). The convolutional neural networks are used to realize that after extracting and deeply fusing the features of the reference signal and the features of the echo signal, and the fused features are entered into the temporal convolutional network TCN to learn the long-term correlation between the reference signal and the echo signal. Finally, the time delay (time difference) tx of the reference signal and the echo signal is extracted through the fully connected layers FC.

In the preset embodiment, the time difference between the reference signal and the echo signal refers to a time delay between generation of the reference signal and obtaining of the echo signal, and the time difference may provide effective guidance for an echo cancellation circuit to cancel the echo signal.

In some alternative implementations of the present embodiment, the time delay estimation model is obtained through training operations as follows: acquiring training samples, where each training sample includes a sample signal and an echo signal corresponding to the sample signal; and performing the training operations: inputting a sample signal and an echo signal corresponding to the sample signal into a first convolutional neural network, to obtain a feature vector of the sample signal and a feature vector of the echo signal corresponding to the sample signal; inputting the feature vector of the sample signal and the feature vector of the echo signal corresponding to the sample signal into a second convolutional neural network, to obtain correlation information of the sample signal and the echo signal corresponding to the sample signal in a preset time period; inputting the correlation information of the sample signal and the echo signal corresponding to the sample signal within the preset time period into fully connected layers, to obtain a time difference between the sample signal and the echo signal corresponding to the sample signal, if the first convolutional neural network, the second convolutional neural network and the fully connected layer meet a training completion condition, using the first convolutional neural network, the second convolutional neural network and the fully connected layers as the time delay estimation model.

In this alternative implementation, the echo signal corresponding to the sample signal in the training sample is also marked with the time difference with the sample signal, and the time delay estimation model may be effectively trained based on the marked time difference.

In this alternative implementation, the above training completion condition includes at least one of the following: the number of training iterations of a time delay estimation network generated by the first convolutional neural network, the second convolutional neural network and the fully connected layer reaches a predetermined iteration threshold, or a loss value of the time delay estimation network is less than a predetermined loss value threshold. Here, the predetermined iteration threshold is an empirical value obtained based on the loss value of the time delay estimation network. For example, the predetermined iteration threshold of the time delay estimation network is 5 thousand times. The predetermined loss value threshold of the time delay estimation network is 0.05.

Alternatively, in response to the time delay estimation network not meeting the training completion condition, relevant parameters in the time delay estimation network are adjusted to make the loss value of the time delay estimation network converge, and the above training operations may continue to be performed based on the adjusted time delay estimation network.

In the present embodiment, the second convolutional neural network may be a temporal convolutional network, and the preset time in the second convolutional neural network may be determined according to a structure of the second convolutional neural network.

Alternatively, the second convolutional neural network may also be replaced by a long short term memory network (LSTM), where the LSTM is improved recurrent neural networks, which may solve the problem that the recurrent neural networks cannot handle long-distance dependencies.

Alternatively, in the present embodiment, the second convolutional neural network may also use a gated recurrent unit (GRU), which is a variant of the LSTM. The GRU maintains effects of the LSTM while making its structure simpler.

The method for training a time delay estimation model provided by the present embodiment, by setting the training completion condition for the first convolutional neural network, the second convolutional neural network, and the fully connected layers, may obtain an effective and reliable time delay estimation model, after the first convolutional neural network, the second convolutional neural network and the fully connected layers meet the training completion condition.

Figure 3:
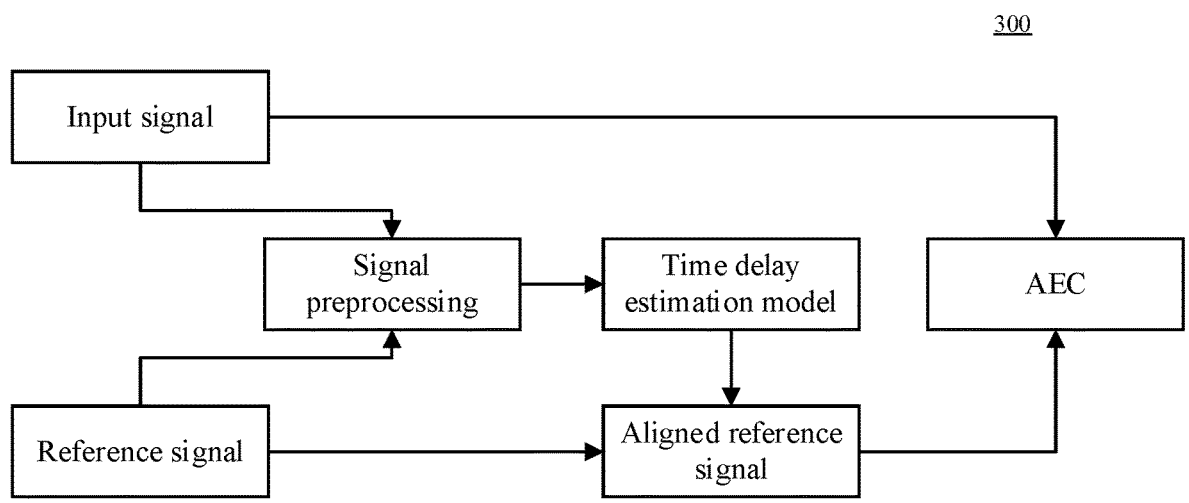
FIG. 3 is a schematic diagram of an application scenario of a time delay estimation model in embodiments of the present disclosure.

As shown in FIG. 3, the time delay estimation model is a main module of audio algorithm work in communication. In practice, the time delay estimation model may receive a microphone input signal (voice signal and echo signal) and a reference signal output to a speaker (the reference signal may be a signal obtained after processing the voice signal), estimate a time delay between the echo signal in the input signal and the reference signal corresponding to the echo, and use the estimated time delay to adjust the reference signal to obtain an aligned reference signal, so that the echo signal and the reference signal are aligned, and then the input signal and the aligned reference signal enter an AEC (Acoustic Echo Cancellation) module for echo cancellation. The echo cancellation in the present embodiment is mainly applied to scenarios such as speakerphone, echo cancellation of microphones and speakers in teleconferencing systems.

The method for processing a signal provided by embodiments of the present disclosure, first, acquires the reference signal of the to-be-tested voice, the reference signal being a signal output to the voice output device, where the voice output device outputs the to-be-tested voice after obtaining the reference signal; secondly, receives, from a voice input device, an echo signal of the to-be-tested voice, the echo signal being a signal of the to-be-tested voice collected by the voice input device; then, performs signal preprocessing on the reference signal and the echo signal respectively; and finally, inputs the processed reference signal and the processed echo signal into the pre-trained time delay estimation model, to obtain the time difference between the reference signal and the echo signal output by the time delay estimation model, the time delay estimation model being used to represent a corresponding relationship between the reference signal, the echo signal and the time difference. Therefore, after signal preprocessing is performed on the reference signal output to the voice output device and the echo signal from the voice input device, the processed reference signal and the processed echo signal are input into the time delay estimation model to obtain the time difference between the reference signal and the echo signal. The time delay estimation model automatically calculates the signal delay between the reference signal and the echo signal, which can not only perform time delay estimation on signals with good linearity, but also perform time delay estimation on signals with poor learning linearity, thus improving the accuracy of signal processing.

Figure 4:
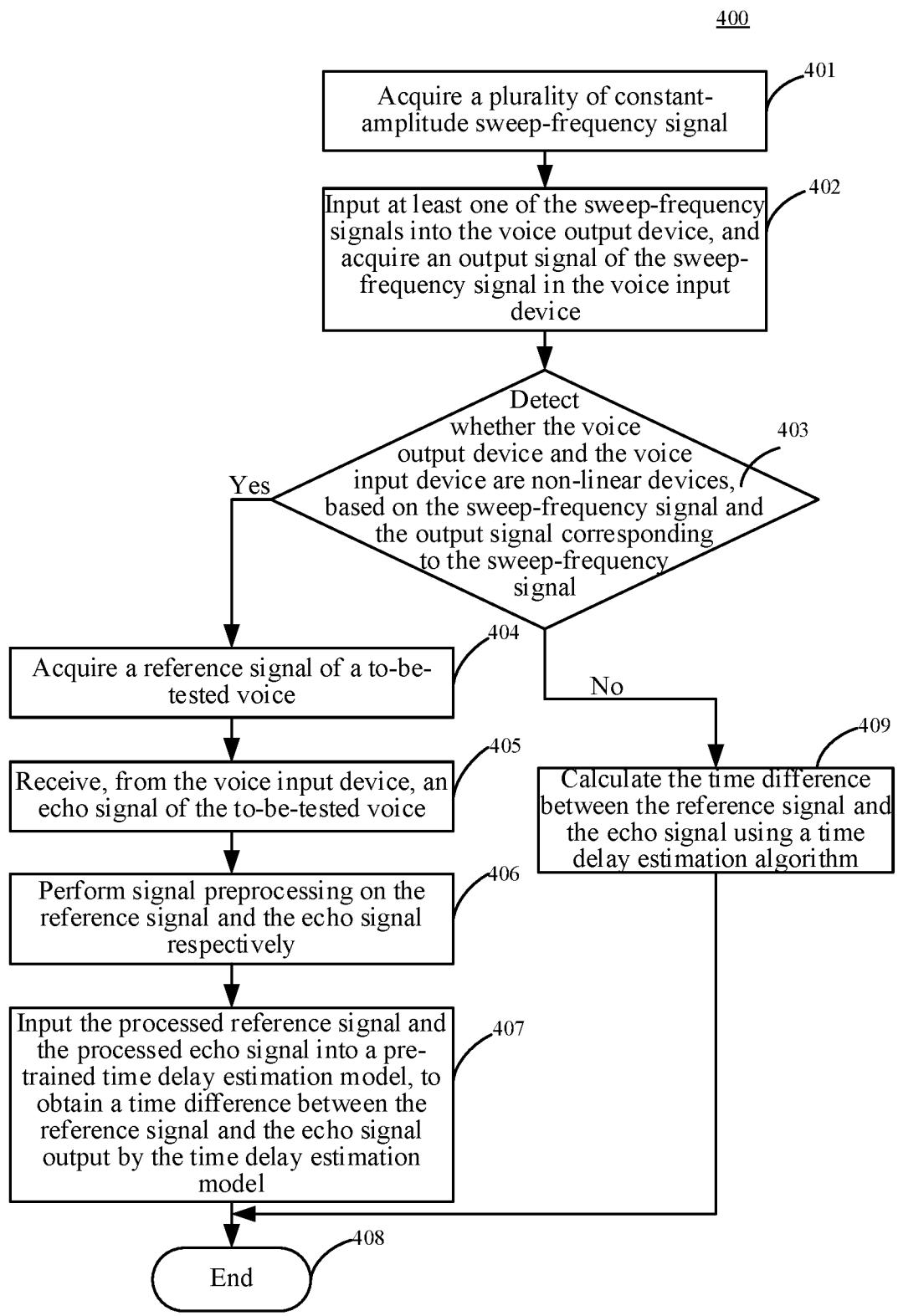
FIG. 4 is a flowchart of the method for processing a signal according to another embodiment of the present disclosure.

The computation based on deep learning is massive, and FIG. 4 is a flow 400 of the method for processing a signal according to another embodiment of the present disclosure. The method for processing a signal includes the following steps:

Step 401, acquiring a plurality of constant-amplitude sweep-frequency signals, then, performing step 402.

In the present embodiment, the sweep-frequency signal is a signal of constant amplitude whose frequency varies periodically within a certain range. Sweep signal is a signal designed to test the voice output device and the voice input device. They are mainly used to test frequency characteristics of a voice output device, a voice input device, or an integral machine containing a voice output device and a voice input device.

Step 402, inputting at least one sweep-frequency signal into the voice output device, and acquiring an output signal of the sweep-frequency signal in the voice input device, then, performing step 403.

In the present embodiment, the sweep-frequency signal is input into the voice output device, the voice output device plays the sweep-frequency signal, the voice input device collects the signal played by the voice output device, and the collected signal is the output signal.

Step 403, detecting whether the voice output device and the voice input device are non-linear devices, based on the sweep signal and the output signal corresponding to the sweep signal; if it is detected that the voice output device and the voice input device are non-linear devices, performing step 404; or if it is detected that the voice output device and the voice input device are linear devices, performing step 409.

In the present embodiment, linear devices and non-linear devices are relative concepts. A test signal is input into a tested device, if an output signal of the tested device has large deviation relative to the input signal, that is, if the distortion is large, the tested device is determined to be a non-linear device; if the deviation of the output signal of the tested device relative to the input signal is small, that is, if the distortion is small, it is determined that the tested device is not a non-linear device, but a linear device.

In the present embodiment, whether the voice output device and the voice input device are non-linear devices is detected based on all of the sweep-frequency signals and output signals of the sweep-frequency signals, includes: determining distortions of the sweep-frequency signals, based on all of the sweep signals and the corresponding output signals of the sweep-frequency signals; if it is determined that distortions of a set ratio of sweep-frequency signals in all the sweep signals are all greater than a preset first distortion threshold, determining that the voice output device and the voice input device corresponding to the voice output device are non-linear devices; or if the distortions of the set ratio of the sweep-frequency signals in all the sweep-frequency signals are less than the preset distortion threshold, it is determined that the voice output device and the voice input device corresponding to the voice output device are linear devices;

Alternatively, whether the voice output device and the voice input device are non-linear devices is detected based on all the sweep-frequency signals and output signals of the sweep-frequency signals, includes: determining the distortions of the sweep-frequency signals, based on the sweep-frequency signals and the corresponding output signals of the sweep-frequency signals; sorting the distortions of all the sweep-frequency signals in the at least one sweep-frequency signal in an ascending order, if distortions of a preset number of sweep-frequency signals in the ascending order from high to low is less than the preset distortion threshold, determining that the voice output device and the voice input device are linear devices; or if the distortions of the preset number of sweep-frequency signals in the ascending order from high to low is greater than the preset distortion threshold, determining that the voice output device and the voice input device are non-linear devices.

The determining the distortions of the sweep-frequency signals includes: for each sweep-frequency signal in the at least one sweep-frequency signal, the voice output device playing the sweep-frequency signal, and the voice input device collecting the output signal corresponding to the sweep-frequency signal, analyzing energy distribution of the sweep-frequency signal based on the output signal, and calculating harmonic distortion of the output signal; and determining the distortion of the sweep-frequency signal based on the harmonic distortion of the output signal.

Step 404, acquiring a reference signal of a to-be-tested voice, then, performing step 405.

The reference signal is a signal output to the voice output device, and the voice output device outputs the to-be-tested voice after obtaining the reference signal.

Step 405, receiving, from a voice input device, an echo signal of the to-be-tested voice, then, performing step 406.

The echo signal is a signal of the to-be-tested voice collected by the voice input device.

Step 406, performing signal preprocessing on the reference signal and the echo signal respectively, then, performing step 407.

In the present embodiment, performing signal preprocessing on the reference signal and the echo signal refers to processing the reference signal and the echo signal in a time domain or a frequency domain, so as to convert the reference signal and the echo signal into signals suitable for being processed by a time delay estimation model.

Step 407, inputting the processed reference signal and the processed echo signal into a pre-trained time delay estimation model, to obtain a time difference between the reference signal and the echo signal output by the time delay estimation model, then, performing step 408.

It should be understood that the operations and features of the above steps 404 to 407 correspond to the operations and features of the steps 101 to 104 respectively. Therefore, the descriptions of the operations and features in the above steps 101 to 104 are also applicable to the steps 404 to 407, and detailed description thereof will be omitted.

Step 408, ending.

Step 409, calculating the time difference between the reference signal and the echo signal using a time delay estimation algorithm, then, performing step 408.

In the present embodiment, the time delay estimation algorithm refers to determining the time difference between the reference signal and the echo signal based on the correlation of the signals. In particular, the time delay estimation algorithm includes: TDE algorithm and generalized cross correlation (GCC) algorithm. The TDE algorithm uses the correlation of the input signal and the reference signal on energy amplitude to estimate the time delay. Each frame occupies 1 bit, and 32 frames form an unsigned integer, so that the time difference can be quickly calculated with the help of computer XOR. After the GCC algorithm is processed using a weighting function, a relatively whitened signal may be obtained, and an impulse peak may be obtained at zero delay, then obtaining the delay of the signal.

The method for processing a signal provided by the present embodiment, performs nonlinear and linear detection on the voice output device and the voice input device by setting a plurality of constant-amplitude sweep-frequency signals, so that it may be determined whether the voice output device and the voice input device can perform linear transformation on the to-be-tested voice. If the voice output device and the voice input device can perform linear transformation on the to-be-tested voice, the time delay estimation algorithm is used to calculate the time difference between the reference signal and the echo signal, and the time delay of the reference signal and the echo signal may be obtained simply and conveniently by means of signal magnitude or phase cross-correlation; if the voice output device and the voice input device cannot perform linear transformation on the to-be-tested voice, the time delay estimation model is used to determine the time delay between the reference signal and the echo signal, which may solve the problem that the time delay cannot be estimated due to magnitude or phase distortion, thereby quickly and accurately estimating the time delay of low-correlation signals.

Figure 5:
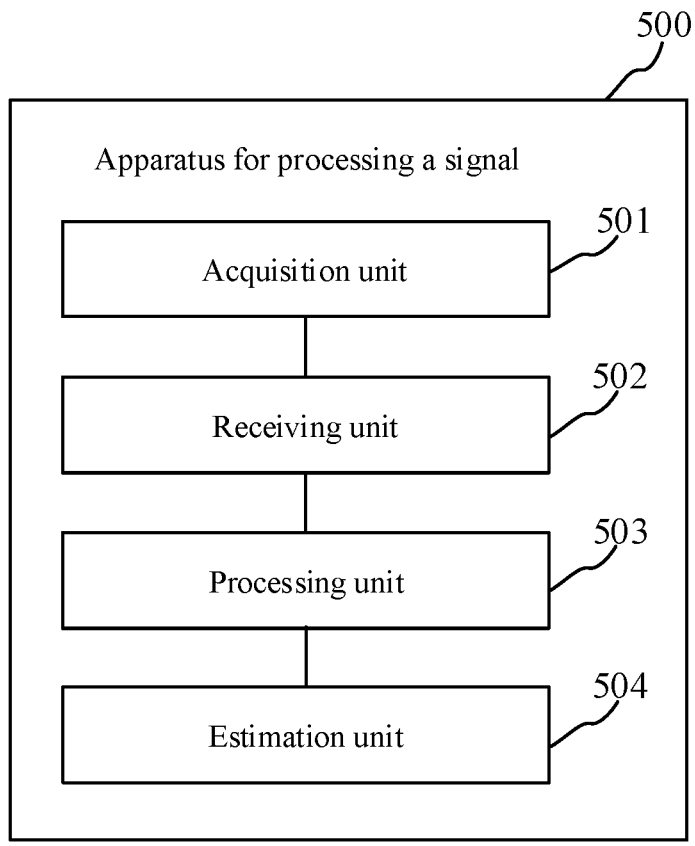
FIG. 5 is a schematic structural diagram of an apparatus for processing a signal according to an embodiment of the present disclosure.

With further reference to FIG. 5, as an implementation of the method shown in the above figures, an embodiment of the present disclosure provides an apparatus for processing a signal, and the apparatus embodiment corresponds to the method embodiment shown in FIG. 1.

As shown in FIG. 5, an apparatus 500 for processing a signal provided by the present embodiment includes: an acquisition unit 501, a receiving unit 502, a processing unit 503 and an estimation unit 504. The acquisition unit 501 may be configured to acquire a reference signal of a to-be-tested voice, the reference signal being a signal output to a voice output device, where the voice output device outputs the to-be-tested voice after obtaining the reference signal. The receiving unit 502 may be configured to receive, from a voice input device, an echo signal of the to-be-tested voice, the echo signal being a signal of the to-be-tested voice collected by the voice input device. The processing unit 503 may be configured to perform signal preprocessing on the reference signal and the echo signal respectively. The estimation unit 504 may be configured to input the processed reference signal and the processed echo signal into a pre-trained time delay estimation model, to obtain a time difference between the reference signal and the echo signal output by the time delay estimation model, the time delay estimation model being used to represent a corresponding relationship between the reference signal, the echo signal and the time difference.

In the present embodiment, in the apparatus 500 for processing a signal: for the detailed processing and the technical effects of the acquisition unit 501, the receiving unit 502, the processing unit 503 and the estimation unit 504, reference may be made to the relevant descriptions of step 101, step 102, step 103 and step 104 in the corresponding embodiment of FIG. 1 respectively, and detailed description thereof will be omitted.

In some alternative implementations of the present embodiment, the apparatus 500 further includes: a sweep-frequency unit (not shown in the figure), an inputting unit (not shown in the figure) and a detection unit (not shown in the figure). The sweep-frequency unit may be configured to acquire a plurality of constant-amplitude sweep-frequency signals. The input unit may be configured to input at least one sweep-frequency signal into the voice output device, and acquire an output signal of the sweep-frequency signal in the voice input device. The detection unit may be configured to detect whether the voice output device and the voice input device are non-linear devices, based on the sweep-frequency signal and the output signal corresponding to the sweep-frequency signal; and in response to determining that the voice output device and the voice input device are non-linear devices, control the acquisition unit 501 to work.

In some alternative implementations of the present embodiment, the apparatus 500 further includes: a time delay unit (not shown in the figure). The time delay unit may be configured to, in response to determining that the voice output device and the voice input device are not non-linear devices, calculate the time difference between the reference signal and the echo signal using a time delay estimation algorithm.

In some alternative implementations of the present embodiment, the time delay estimation model is obtained through training steps as follows: acquiring training samples, where each training sample includes a sample signal and an echo signal corresponding to the sample signal; and performing the training operations: inputting a sample signal and an echo signal corresponding to the sample signal into a first convolutional neural network, to obtain a feature vector of the sample signal and a feature vector of the echo signal corresponding to the sample signal; inputting the feature vector of the sample signal and the feature vector of the echo signal corresponding to the sample signal into a second convolutional neural network, to obtain correlation information of the sample signal and the echo signal corresponding to the sample signal within a preset time period; inputting the correlation information of the sample signal and the echo signal corresponding to the sample signal within the preset time period into a fully connected layer, to obtain a time difference between the sample signal and the echo signal corresponding to the sample signal; in response to determining that the first convolutional neural network, the second convolutional neural network, and the fully connected layer meet a training completion condition, using the first convolutional neural network, the second convolutional neural network, and the fully connected layer as the time delay estimation model.

In some alternative implementations of the present embodiment, the processing unit 503 includes: a catenation module (not shown in the figure) and a magnitude spectrogram module (not shown in the figure). The catenation module may be configured to perform subband decomposition and catenation on the reference signal and the echo signal respectively. The magnitude spectrogram module may be configured to obtain magnitude spectrograms of the catenated signals to obtain the processed reference signal and the processed echo signal.

In some alternative implementations of the present embodiment, the processing unit 503 may be further configured to: perform frequency domain transformation on the reference signal and the echo signal respectively, to obtain the processed reference signal and the processed echo signal.

The apparatus for processing a signal provided by the above embodiment of the present disclosure, first, the acquisition unit 501 acquires the reference signal of the to-be-tested voice, the reference signal being a signal output to the voice output device, where the voice output device outputs the to-be-tested voice after obtaining the reference signal; secondly, the receiving unit 502 receives the echo signal of the to-be-tested voice from the voice input device, the echo signal being a signal of the to-be-tested voice collected by the voice input device, then, the processing unit 503 performs signal preprocessing on the reference signal and the echo signal respectively; and finally, the estimation unit 504 inputs the processed reference signal and the processed echo signal into the pre-trained time delay estimation model, to obtain the time difference between the reference signal and the echo signal output by the time delay estimation model, the time delay estimation model being used to represent a corresponding relationship between the reference signal, the echo signal and the time difference. Therefore, after signal preprocessing is performed on the reference signal output to the voice output device and the echo signal from the voice input device, the processed reference signal and the processed echo signal are input into the time delay estimation model to obtain the time difference between the reference signal and the echo signal. The time delay estimation model automatically calculates the signal delay between the reference signal and the echo signal, which can not only perform time delay estimation on signals with good linearity, but also perform time delay estimation on signals with poor learning linearity, thus improving the accuracy of signal processing.

In the technical solution of the present disclosure, the collection, storage, use, processing, transmission, provision and disclosure of the user personal information involved are all in compliance with the relevant laws and regulations, and do not violate public order and good customs.

According to an embodiment of the present disclosure, embodiments of the present disclosure also provides an electronic device, a readable storage medium, and a computer program product.

Figure 6:
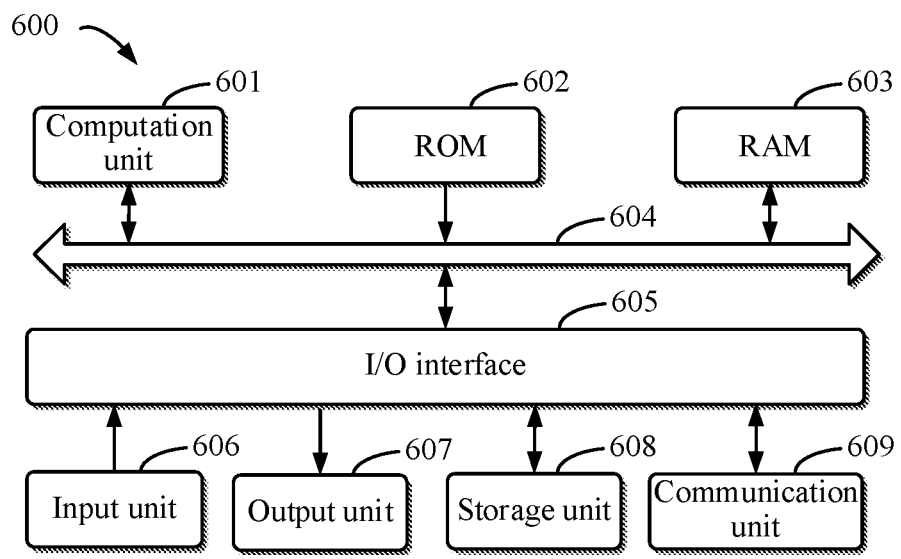
FIG. 6 is a block diagram of an electronic device used to implement the method for processing a signal of embodiments of the present disclosure.

FIG. 6 illustrates a schematic block diagram of an example electronic device 600 that may be used to implement embodiments of the present disclosure. The electronic device is intended to represent various forms of digital computers, such as laptop computers, desktop computers, workbenches, personal digital assistants, servers, blade servers, mainframe computers, and other suitable computers. The electronic device may also represent various forms of mobile apparatuses, such as personal digital processors, cellular phones, smart phones, wearable devices, and other similar computing apparatuses. The components shown herein, their connections and relationships, and their functions are merely examples, and are not intended to limit the implementation of the present disclosure described and/or claimed herein.

As shown in FIG. 6, the device 600 includes a computation unit 601, which may perform various appropriate actions and processing, based on a computer program stored in a read-only memory (ROM) 602 or a computer program loaded from a storage unit 608 into a random access memory (RAM) 603. In the RAM 603, various programs and data required for the operation of the device 600 may also be stored. The computation unit 601, the ROM 602, and the RAM 603 are connected to each other through a bus 604. An input/output (I/O) interface 605 is also connected to the bus 604.

A plurality of parts in the device 600 are connected to the I/O interface 605, including: an input unit 606, for example, a keyboard and a mouse; an output unit 607, for example, various types of displays and speakers; the storage unit 608, for example, a disk and an optical disk; and a communication unit 609, for example, a network card, a modem, or a wireless communication transceiver. The communication unit 609 allows the device 600 to exchange information/data with other devices over a computer network such as the Internet and/or various telecommunication networks.

The computation unit 601 may be various general-purpose and/or dedicated processing components having processing and computing capabilities. Some examples of the computation unit 601 include, but are not limited to, central processing unit (CPU), graphics processing unit (GPU), various dedicated artificial intelligence (AI) computing chips, various computation units running machine learning model algorithms, digital signal processors (DSP), and any appropriate processors, controllers, microcontrollers, etc. The computation unit 601 performs the various methods and processes described above, such as a method for processing a signal. For example, in some embodiments, the method for processing a signal may be implemented as a computer software program, which is tangibly included in a machine readable medium, such as the storage unit 608. In some embodiments, part or all of the computer program may be loaded and/or installed on the device 600 via the ROM 602 and/or the communication unit 609. When the computer program is loaded into the RAM 603 and executed by the computation unit 601, one or more steps of the method for processing a signal described above may be performed. Alternatively, in other embodiments, the computation unit 601 may be configured to perform the method for processing a signal by any other appropriate means (for example, by means of firmware).

Various embodiments of the systems and technologies described above herein may be implemented in digital electronic circuit systems, integrated circuit systems, field programmable gate arrays (FPGA), application specific integrated circuits (ASIC), application specific standard products (ASSP), system on chip (SOC), load programmable logic devices (CPLD), computer hardware, firmware, software, and/or combinations thereof. These various embodiments may include being implemented in one or more computer programs that may be executed and/or interpreted on a programmable system including at least one programmable processor, which may be a dedicated or general programmable processor that may receive data and instructions from a storage system, at least one input device, and at least one output device, and transmit data and instructions to the storage system, the at least one input device, and the at least one output device.

The program code for implementing the methods of the present disclosure may be written in any combination of one or more programming languages. These program codes can be provided to the processor or controller of general computer, dedicated computer or other programmable data processing device, so that when executed by the processor or controller, the program code enables the functions/operations specified in the flow chart and/or block diagram to be implemented. The program code can be executed completely on the machine, partially on the machine, partially on the machine and partially on the remote machine as a separate software package, or completely on the remote machine or server.

In the context of the present disclosure, a machine readable medium may be a tangible medium which may contain or store a program for use by, or used in combination with, an instruction execution system, apparatus or device. The machine readable medium may be a machine readable signal medium or a machine readable storage medium. The computer readable medium may include, but is not limited to, electronic, magnetic, optical, electromagnetic, infrared, or semiconductor systems, apparatuses, or devices, or any appropriate combination of the above. A more specific example of the machine readable storage medium will include an electrical connection based on one or more pieces of wire, a portable computer disk, a hard disk, a random access memory (RAM), a read only memory (ROM), an erasable programmable read only memory (EPROM or flash memory), an optical fiber, a portable compact disk read only memory (CD-ROM), an optical storage device, a magnetic storage device, or any appropriate combination of the above.

To provide interaction with a user, the systems and technologies described herein may be implemented on a computer that is provided with: a display apparatus (e.g., a CRT (cathode ray tube) or an LCD (liquid crystal display) monitor) configured to display information to the user; and a keyboard and a pointing apparatus (e.g., a mouse or a trackball) by which the user can provide an input to the computer. Other kinds of apparatuses may also be configured to provide interaction with the user. For example, feedback provided to the user may be any form of sensory feedback (e.g., visual feedback, auditory feedback, or tactile feedback); and an input may be received from the user in any form (including an acoustic input, a voice input, or a tactile input).

The systems and technologies described herein may be implemented in a computing system that includes a back-end component (e.g., as a data server), or a computing system that includes a middleware component (e.g., an application server), or a computing system that includes a front-end component (e.g., a user computer with a graphical user interface or a web browser through which the user can interact with an implementation of the systems and technologies described herein), or a computing system that includes any combination of such a back-end component, such a middleware component, or such a front-end component. The components of the system may be interconnected by digital data communication (e.g., a communication network) in any form or medium. Examples of the communication network include: a local area network (LAN), a wide area network (WAN), and the Internet.

The computer system may include a client and a server. The client and the server are generally remote from each other, and generally interact with each other through a communication network. The relationship between the client and the server is generated by virtue of computer programs that run on corresponding computers and have a client-server relationship with each other. The server may be a cloud server, a distributed system server, or a server combined with blockchain.

It should be understood that the various forms of processes shown above may be used to reorder, add, or delete steps. For example, the steps disclosed in embodiments of the present disclosure may be executed in parallel, sequentially, or in different orders, as long as the desired results of the technical solutions mentioned in embodiments of the present disclosure can be implemented. This is not limited herein.

The above specific implementations do not constitute any limitation to the scope of protection of the present disclosure. It should be understood by those skilled in the art that various modifications, combinations, sub-combinations, and replacements may be made according to the design requirements and other factors. Any modification, equivalent replacement, improvement, and the like made within the principle of the present disclosure should be encompassed within the scope of protection of the present disclosure.

What is claimed is:

1. A method for processing a signal, the method comprising:
    acquiring a reference signal of a to-be-tested voice, the reference signal being a signal output to a voice output device, wherein the voice output device outputs the to-be-tested voice after obtaining the reference signal;
    receiving, from a voice input device, an echo signal of the to-be-tested voice, the echo signal being a signal of the to-be-tested voice collected by the voice input device;
    performing signal preprocessing on the reference signal and the echo signal respectively; and
    inputting the processed reference signal and the processed echo signal into a pre-trained time delay estimation model, to obtain a time difference between the reference signal and the echo signal output by the time delay estimation model, the time delay estimation model being used to represent a corresponding relationship between the reference signal, the echo signal and the time difference, wherein the time delay estimation model is configured to extract a feature of the reference signal and a feature of the echo signal, and is obtained by training operations based on long-term correlations between features of reference signals and features of echo signals; the time delay estimation model comprises: a convolutional neural network, a temporal convolutional network, and a fully connected layer, wherein the convolutional neural network, the temporal convolutional network and the fully connected layer are connected in sequence, the convolutional neural network is configured to extract and deeply fuse the feature of the reference signal and the feature of the echo signal, the temporal convolutional network is configured to learn the long-term correlation between the feature of the reference signal and the feature of the echo signal, and the fully connected layer is configured to extract the time delay between the reference signal and the echo signal.

2. The method according to claim 1, wherein, before acquiring the reference signal of the to-be-tested voice, the method further comprises:
    acquiring a plurality of constant-amplitude sweep-frequency signals;
    inputting at least one sweep-frequency signal into the voice output device, and acquiring an output signal of the sweep-frequency signal in the voice input device;
    detecting whether the voice output device and the voice input device are non-linear devices, based on the sweep-frequency signal and the output signal corresponding to the sweep-frequency signal; and
    in response to determining that the voice output device and the voice input device are non-linear devices, acquiring the reference signal of the to-be-tested voice.

3. The method according to claim 2, wherein the method further comprises:
    in response to determining that the voice output device and the voice input device are not non-linear devices, calculating the time difference between the reference signal and the echo signal using a time delay estimation algorithm.

4. The method according to claim 1, wherein the time delay estimation model is obtained through training operations as follows:
acquiring training samples, wherein each training sample comprises a sample signal and an echo signal corresponding to the sample signal; and
performing the training operations: inputting a sample signal and an echo signal corresponding to the sample signal into a first convolutional neural network, to obtain a feature vector of the sample signal and a feature vector of the echo signal corresponding to the sample signal; inputting the feature vector of the sample signal and the feature vector of the echo signal corresponding to the sample signal into a second convolutional neural network, to obtain correlation information of the sample signal and the echo signal corresponding to the sample signal within a preset time period; inputting the correlation information of the sample signal and the echo signal corresponding to the sample signal within the preset time period into a fully connected layer, to obtain a time difference between the sample signal and the echo signal corresponding to the sample signal; in response to determining that the first convolutional neural network, the second convolutional neural network, and the fully connected layer meet a training completion condition, using the first convolutional neural network, the second convolutional neural network, and the fully connected layer as the time delay estimation model.

5. The method according to claim 1, wherein the performing signal preprocessing on the reference signal and the echo signal respectively, comprises:
performing subband decomposition and catenation on the reference signal and the echo signal respectively; and
obtaining magnitude spectrograms of the catenated signals to obtain the processed reference signal and the processed echo signal.

6. The method according to claim 1, wherein the performing signal preprocessing on the reference signal and the echo signal respectively, comprises:
performing frequency domain transformation on the reference signal and the echo signal respectively, to obtain the processed reference signal and the processed echo signal.

7. An apparatus for processing a signal, the apparatus comprising:
at least one processor; and
a memory communicatively connected to the at least one processor; wherein,
the memory stores instructions executable by the at least one processor, and the instructions, when executed by the at least one processor, cause the at least one processor to perform operations, the operations comprising:
acquiring a reference signal of a to-be-tested voice, the reference signal being a signal output to a voice output device, wherein the voice output device outputs the to-be-tested voice after obtaining the reference signal;
receiving, from a voice input device, an echo signal of the to-be-tested voice, the echo signal being a signal of the to-be-tested voice collected by the voice input device;
performing signal preprocessing on the reference signal and the echo signal respectively; and
inputting the processed reference signal and the processed echo signal into a pre-trained time delay estimation model, to obtain a time difference between the reference signal and the echo signal output by the time delay estimation model, the time delay estimation model being used to represent a corresponding relationship between the reference signal, the echo signal and the time difference, wherein the time delay estimation model is configured to extract a feature of the reference signal and a feature of the echo signal, and is obtained by training operations based on long-term correlations between features of reference signals and features of echo signals; the time delay estimation model comprises: a convolutional neural network, a temporal convolutional network, and a fully connected layer, wherein the convolutional neural network, the temporal convolutional network and the fully connected layer are connected in sequence, the convolutional neural network is configured to extract and deeply fuse the feature of the reference signal and the feature of the echo signal, the temporal convolutional network is configured to learn the long-term correlation between the feature of the reference signal and the feature of the echo signal, and the fully connected layer is configured to extract the time delay between the reference signal and the echo signal.

8. The apparatus according to claim 7, wherein, before acquiring the reference signal of the to-be-tested voice, the operations further comprise:
acquiring a plurality of constant-amplitude sweep-frequency signals;
inputting at least one sweep-frequency signal into the voice output device, and acquiring an output signal of the sweep-frequency signal in the voice input device;
detecting whether the voice output device and the voice input device are non-linear devices, based on the sweep-frequency signal and the output signal corresponding to the sweep-frequency signal; and
in response to determining that the voice output device and the voice input device are non-linear devices, acquiring the reference signal of the to-be-tested voice.

9. The apparatus according to claim 8, wherein the operations further comprise:
in response to determining that the voice output device and the voice input device are not non-linear devices, calculating the time difference between the reference signal and the echo signal using a time delay estimation algorithm.

10. The apparatus according to claim 7, wherein the time delay estimation model is obtained through training operations as follows:
acquiring a training sample, wherein the training sample comprises a sample signal and an echo signal corresponding to the sample signal; and
performing the training operations: inputting a sample signal and an echo signal corresponding to the sample signal into a first convolutional neural network, to obtain a feature vector of the sample signal and a feature vector of the echo signal corresponding to the sample signal; inputting the feature vector of the sample signal and the feature vector of the echo signal corresponding to the sample signal into a second convolutional neural network, to obtain correlation information of the sample signal and the echo signal corresponding to the sample signal within a preset time period; inputting the correlation information of the sample signal and the echo signal corresponding to the sample signal within the preset time period into a fully connected layer, to obtain a time difference between the sample signal and the echo signal corresponding to the sample signal; in response to determining that the first convolutional neural network, the second convolutional neural network, and the fully connected layer meet a training completion condition, using the first convolutional neural network, the second convolutional neural network, and the fully connected layer as the time delay estimation model.

11. The apparatus according to claim 7, wherein the performing signal preprocessing on the reference signal and the echo signal respectively, comprises:
performing subband decomposition and catenation on the reference signal and the echo signal respectively; and
obtaining magnitude spectrograms of the catenated signals to obtain the processed reference signal and the processed echo signal.

12. The apparatus according to claim 7, wherein the performing signal preprocessing on the reference signal and the echo signal respectively, comprises: performing frequency domain transformation on the reference signal and the echo signal respectively, to obtain the processed reference signal and the processed echo signal.

13. A non-transitory computer readable storage medium storing computer instructions, wherein, the computer instructions, when executed by a computer, cause the computer to perform operations, the operations comprising:
acquiring a reference signal of a to-be-tested voice, the reference signal being a signal output to a voice output device, wherein the voice output device outputs the to-be-tested voice after obtaining the reference signal;
receiving, from a voice input device, an echo signal of the to-be-tested voice, the echo signal being a signal of the to-be-tested voice collected by the voice input device;
performing signal preprocessing on the reference signal and the echo signal respectively; and
inputting the processed reference signal and the processed echo signal into a pre-trained time delay estimation model, to obtain a time difference between the reference signal and the echo signal output by the time delay estimation model, the time delay estimation model being used to represent a corresponding relationship between the reference signal, the echo signal and the time difference, wherein the time delay estimation model is configured to extract a feature of the reference signal and a feature of the echo signal, and is obtained by training operations based on long-term correlations between features of reference signals and features of echo signals; the time delay estimation model comprises: a convolutional neural network, a temporal convolutional network, and a fully connected layer, wherein the convolutional neural network, the temporal convolutional network and the fully connected layer are connected in sequence, the convolutional neural network is configured to extract and deeply fuse the feature of the reference signal and the feature of the echo signal, the temporal convolutional network is configured to learn the long-term correlation between the feature of the reference signal and the feature of the echo signal, and the fully connected layer is configured to extract the time delay between the reference signal and the echo signal.

14. The storage medium according to claim 13, wherein, before acquiring the reference signal of the to-be-tested voice, the operations further comprise:

acquiring a plurality of constant-amplitude sweep-frequency signals;
inputting at least one sweep-frequency signal into the voice output device, and acquiring an output signal of the sweep-frequency signal in the voice input device;
detecting whether the voice output device and the voice input device are non-linear devices, based on the sweep-frequency signal and the output signal corresponding to the sweep-frequency signal; and
in response to determining that the voice output device and the voice input device are non-linear devices, acquiring the reference signal of the to-be-tested voice.

15. The storage medium according to claim 14, wherein the operations further comprise:
in response to determining that the voice output device and the voice input device are not non-linear devices, calculating the time difference between the reference signal and the echo signal using a time delay estimation algorithm.

16. The storage medium according to claim 13, wherein the time delay estimation model is obtained through training operations as follows:
acquiring a training sample, wherein the training sample comprises a sample signal and an echo signal corresponding to the sample signal; and
performing the training operations: inputting a sample signal and an echo signal corresponding to the sample signal into a first convolutional neural network, to obtain a feature vector of the sample signal and a feature vector of the echo signal corresponding to the sample signal; inputting the feature vector of the sample signal and the feature vector of the echo signal corresponding to the sample signal into a second convolutional neural network, to obtain correlation information of the sample signal and the echo signal corresponding to the sample signal within a preset time period; inputting the correlation information of the sample signal and the echo signal corresponding to the sample signal within the preset time period into a fully connected layer, to obtain a time difference between the sample signal and the echo signal corresponding to the sample signal; in response to determining that the first convolutional neural network, the second convolutional neural network, and the fully connected layer meet a training completion condition, using the first convolutional neural network, the second convolutional neural network, and the fully connected layer as the time delay estimation model.

17. The storage medium according to claim 13, wherein the performing signal preprocessing on the reference signal and the echo signal respectively, comprises:
performing subband decomposition and catenation on the reference signal and the echo signal respectively; and
obtaining magnitude spectrograms of the catenated signals to obtain the processed reference signal and the processed echo signal.

18. The storage medium according to claim 13, wherein the performing signal preprocessing on the reference signal and the echo signal respectively, comprises: performing frequency domain transformation on the reference signal and the echo signal respectively, to obtain the processed reference signal and the processed echo signal.

* * * * *